United States Patent
Inagawa et al.

(10) Patent No.: US 7,557,547 B2
(45) Date of Patent: Jul. 7, 2009

(54) SELF EXITED OSCILLATION CONVERTER PROVIDING A STABLE OUTPUT VOLTAGE FROM A WIDE RANGE OF INPUT VOLTAGES

(75) Inventors: Toshinori Inagawa, Wako (JP); Motohiro Shimizu, Wako (JP); Kenji Kamimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 175 days.

(21) Appl. No.: 10/594,628

(22) PCT Filed: Mar. 15, 2005

(86) PCT No.: PCT/JP2005/004518

§ 371 (c)(1),
(2), (4) Date: Sep. 28, 2006

(87) PCT Pub. No.: WO2005/099073

PCT Pub. Date: Oct. 20, 2005

(65) Prior Publication Data

US 2007/0206394 A1    Sep. 6, 2007

(30) Foreign Application Priority Data

Mar. 31, 2004    (JP) .............................. 2004-102144

(51) Int. Cl.
*H02M 3/335*    (2006.01)
(52) U.S. Cl. ....................................... 323/266; 363/18
(58) Field of Classification Search ................. 323/266, 323/901; 363/18, 19, 49
See application file for complete search history.

(56) References Cited

U.S. PATENT DOCUMENTS 3,353,080 A * 11/1967 Santelmann, Jr. ............ 363/23

(Continued)

FOREIGN PATENT DOCUMENTS

JP    7-87601 A    3/1995

(Continued)

OTHER PUBLICATIONS

International Search Report of PCT/JP2005/004518, date of mailing Jul. 5, 2005.

(Continued)

*Primary Examiner*—Jeffrey L Sterrett
(74) *Attorney, Agent, or Firm*—Westerman, Hattori, Daniels & Adrian, LLP.

(57) ABSTRACT

The present invention provides a control power supply capable of stably operating to output a desired voltage as electric power, even when the input voltage thereof varies over a wide range.

A power supply includes a rectification circuit 2 for rectifying the AC output from a power generator 1 and a non-insulation type DC/DC converter 3 for stepping down the DC output from the rectification circuit 2. A self-excited oscillation type converter (RCC) 4 is provided at the following stage of the non-insulation type DC/DC converter 3. The input voltage which has been stepped down by the converter 3 is input to the primary side of the RCC 4, and the RCC 4 stably operates with the input voltage which varies largely to supply, from its secondary side, a power supply to an ECU 5 or the like.

3 Claims, 4 Drawing Sheets

U.S. PATENT DOCUMENTS

| | | | | |
|---|---|---|---|---|
| 3,478,256 | A | * 11/1969 | Tomota | 363/23 |
| 3,967,181 | A | * 6/1976 | Chambers et al. | 363/23 |
| 4,030,024 | A | * 6/1977 | Chambers et al. | 323/267 |
| 4,307,440 | A | * 12/1981 | Inoue et al. | 363/15 |
| 4,510,564 | A | * 4/1985 | Seer, Jr. | 363/23 |
| 4,577,267 | A | * 3/1986 | Juutilainen | 363/19 |
| 5,070,439 | A | * 12/1991 | Remson | 363/22 |
| 5,239,453 | A | * 8/1993 | Remson | 363/19 |
| 5,430,641 | A | * 7/1995 | Kates | 363/133 |
| 5,527,637 | A | 6/1996 | Nakazawa et al. | |
| 5,574,357 | A | 11/1996 | Otake et al. | |
| 5,675,491 | A | * 10/1997 | Kijima | 363/133 |
| 6,151,223 | A | 11/2000 | Tamura et al. | |

FOREIGN PATENT DOCUMENTS

| | | |
|---|---|---|
| JP | 8-98514 A | 4/1996 |
| JP | 10-23749 A | 1/1998 |
| JP | 2000-4579 A | 1/2000 |
| JP | 2002-51591 A | 2/2002 |
| JP | 2003-319655 A | 11/2003 |
| JP | 2003-333835 A | 11/2003 |

OTHER PUBLICATIONS

Translation of the International Preliminary Report on Patentability of International Application No. PCT/JP 2005/004518, with Form PCT/IB/373 and Form PCT/ISA/237.

* cited by examiner

SELF EXITED OSCILLATION CONVERTER PROVIDING A STABLE OUTPUT VOLTAGE FROM A WIDE RANGE OF INPUT VOLTAGES

TECHNICAL FIELD

The present invention relates to a power supply device and, more particularly, relates to a power supply device capable of providing an electric power with a stable voltage from the output electric power of a power generator.

BACKGROUND ART

As control-device power supplies such as general-purpose engines for driving various types of working machines, there are known power supplies which utilize the outputs of power generators which are driven by engines. This type of power supply devices are required to ensure sufficient electric power, even when the engine has a lower rotation speed and, thus, the power generator generates a lower input voltage. However, if such a power supply device is set to ensure sufficient electric power over a lower rotation-speed range, this will cause the problem of greater electric power losses at higher rotation speeds and, therefore, greater input voltages from the power generator.

To cope with the aforementioned problem, there has been suggested a system which supplies the output of a power generator, as a power supply, to a control device, through a transformer, as described in, for example, Japanese Patent Application Laid-open No. 2002-51591. This system can suppress the rise of the voltage with the transformer to provide required electric power. Patent Document 1: JP 2002-51591 A

DISCLOSURE OF THE INVENTION

Problem to be Solved by the Invention

It is expected that, if an engine power generator employs a transformer as in the system described in the publication, the input voltage of the transformer is varied over a wide range of from several volts (V) to 500 V, since the engine significantly varies its rotation speed. Accordingly, it is necessary that the transformer has a greater withstand voltage or a switching circuit, such as a down converter provided at the output side of the transformer, has a higher withstand voltage. Further, since the output of the power generator is supplied to the down converter through the transformer, it is difficult to ensure a stable power supply at lower rotation speeds and, therefore, lower voltages.

It is an object of the present invention to provide a power supply device capable of ensuring a stable output voltage as electric power, even when the power generator varies its output over a wide range.

Means for Solving Problem

In order to attain the object, the present invention provides a power supply device including a rectification circuit for rectifying the output of an AC power generator and a DC voltage reduction means for reducing the output of the rectification circuit, wherein the power supply device has a first characteristic that the voltage reduction means is anon-insulation type DC/DC converter, and there is provided a self-excited oscillation type converter having a primary side connected to the output side of the non-insulation type DC/DC converter and a secondary side used as the power supply output.

The present invention has a second characteristic that the power supply device includes a switching means for performing duty control on the non-insulation type DC/DC converter, and a switching-means driving circuit which maintains the switching means at an ON state until the AC output voltage from the AC power generator exceeds a predetermined value and starts the duty control with the switching means at the time when the AC output voltage exceeds the predetermined value.

Effect of the Invention

The present invention has a third characteristic that the self-excited oscillation type converter is structured to start operation before the AC output voltage reaches the predetermined value that causes the start of the duty control for the DC/DC converter.

According to the first characteristic, the output of the power generator is reduced by the non-insulation type DC/DC converter circuit, at first. Then, this output which has been reduced is inputted to the self-excited oscillation type converter as an input value to create a stabilized output. Therefore the power supply device capable of generating a stable output, even when the power generator varies its output over a wide range, can be provided.

Since there is provided the non-insulation type DC/DC converter including no transformer, at the previous stage of the self-excited oscillation type converter, it is possible to prevent the occurrence of delays in the rise of the voltage and losses in a transformer, which would occur in cases of including a transformer. This can introduce the generated power output to the converter with higher efficiency, at lower rotation speeds of the power generator.

Since the self-excited oscillation type converter operates with the reduced input, there is no need for setting the withstand voltage of the transformer in the self-excited oscillation type converter to a higher value, thereby realizing reduction of the cost of the entire power supply device.

According to the second characteristic, since the non-insulation type DC/DC converter is maintained at the ON state at lower rotation speeds, it is possible to utilize all the output of the power generator as an electric-power source. On the other hand, at the time when the output of the power generator exceeds the predetermined value, the duty control thereon is started to suppress the input voltage of the self-excited oscillation type converter. This can efficiently utilize the generated electric power without wasting it at lower rotation speeds and also can provide stable outputs on the basis of the suppressed input voltage, at increased rotation speeds.

According to the third characteristic, the self-excited oscillation type converter operates with the output of the non-insulation type DC/DC converter, and the self-excited oscillation type converter can rapidly rise to form a stable power supply, before the non-insulation type DC/DC converter generates a predetermined maximum voltage, namely in a lower rotation-speed range.

DESCRIPTION OF THE REFERENCE NUMERALS

1: power generator, 3: down converter (non-insulation type DC/DC converter), 4: RCC (self-excited oscillation type converter), 8: output condenser, 11: FET, 12: choke coil, 14: PWM circuit, 15: comparator, 23: oscillation circuit

BEST MODE FOR CARRYING OUT THE INVENTION

Figure 1:
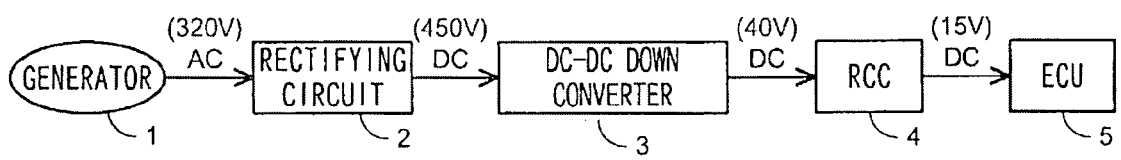
FIG. 1 is a main-part structure of an engine power generator including a power supply device according to an embodiment of the present invention.

Hereinafter, with reference to the drawings, an embodiment of the present invention will be described. FIG. 1 is a block diagram illustrating the structure of an engine power generating device including a power supply device according to an embodiment of the present invention. The engine power generating device preferably includes no battery or includes a battery and a recoil starter which can be manually activated in the event that the battery generates excessive electric power. This engine power generating device includes a power generator 1, a rectification circuit 2, a voltage reduce-type DC-DC converter circuit 3, a self-excited oscillation type converter (RCC) 4 and an ECU 5. The power generator 1 is driven by an engine and outputs a three-phase AC voltage of AC320V, for example, at a rated operation state. The rectification circuit 2 rectifies the three-phase AC voltage into a DC voltage of, for example, 450 V and inputs the resultant DC voltage to the voltage reduce-type DC-DC converter circuit (hereinafter, simply referred to as "a down converter") 3. The down converter 3 drops the input DC voltage to a predetermined DC voltage of, for example, 40 V, through duty control with switching of semiconductor switches.

The down converter 3 is connected, at its output side, to the primary side of the RCC 4. The RCC 4 is connected, at its secondary side, to the engine control device, namely the ECU 5, which drives the power generator 1. Thus, the three-phase AC voltage generated from the power generator 1 is rectified and, then, the rectified voltage is dropped to, for example, 40 V by the down converter 3. Further, the dropped voltage is changed to a stable voltage of, for example, 15 V by the RCC 4 and, then, the stable voltage is supplied, as a controlled power supply, to the ECU 5.

Figure 2:
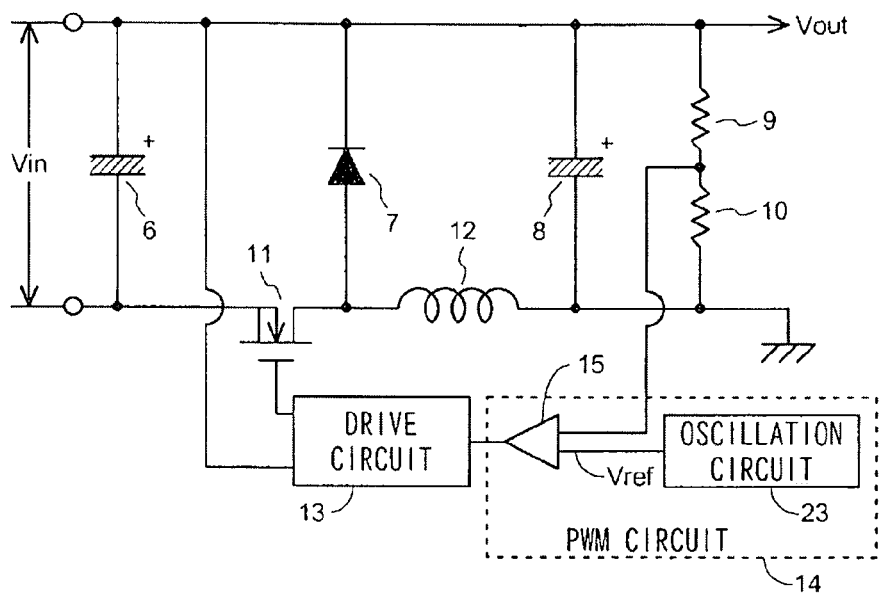
FIG. 2 is a circuit diagram illustrating the basis structure of a down converter.

FIG. 2 is a view illustrating the basic circuit structure of the down converter 3. The down converter 3 is a non-insulating type converter including no transformer. In the drawing, between the positive side and the negative side of the output (voltage Vin) of the rectification circuit 2, there are provided an input condenser 6, a flywheel diode 7, an output condenser 8 and output-voltage detection resistances 9 and 10.

Between the negative side of the DC power supply and the negative side of the output condenser 8, an N-channel type MOS-FET 11 and a step-down choke coil (reactor) 12 are connected in serial. A drive circuit 13 is provided for applying a voltage to the gate of the FET 11. The drive circuit 13 outputs driving signals for bringing the FET 11 into conduction/non-conduction (turning on/turning off the FET 11). There is provided a PWM circuit 14 for generating PWM signals (pulse signals) which determine the duty (on-time ratio) of the driving signals output from the drive circuit 13. The PWM circuit 14 includes an oscillation circuit (see the detail thereof in FIG. 3) 23 for generating a reference voltage (triangular wave) Vref which determines the duty of the PWM signals. There is provided a comparator 15 which makes a comparison between the reference voltage Vref and the voltage resulted from the voltage division with the resistances 9 and 10.

If the voltage resulted from the voltage division with the resistances 9 and 10 is smaller than the reference voltage Vref, the PWM circuit 14 outputs PWM signals with a duty of 100%, in order to maintain the FET 11 at an ON state. On the other hand, if the voltage resulted from the voltage division with the resistances 9 and 10 is greater than the reference voltage Vref, the PWM circuit 14 outputs PWM signals with a duty less than 100% which is determined on the basis of the reference voltage Vref and the voltage resulted from the voltage division with the resistances 9 and 10.

The drive circuit 13 supplies driving signals to the gate of the FET 11 according to the PWM signals output from the PWM circuit 14, which causes the output condenser 8 to be charged with a voltage corresponding to the on-time ratio of the FET 11. The average charging voltage resulted from the smoothing by the output condenser 8 is the output voltage Vout. The output voltage Vout is connected to the primary side of the RCC 4.

Figure 3:
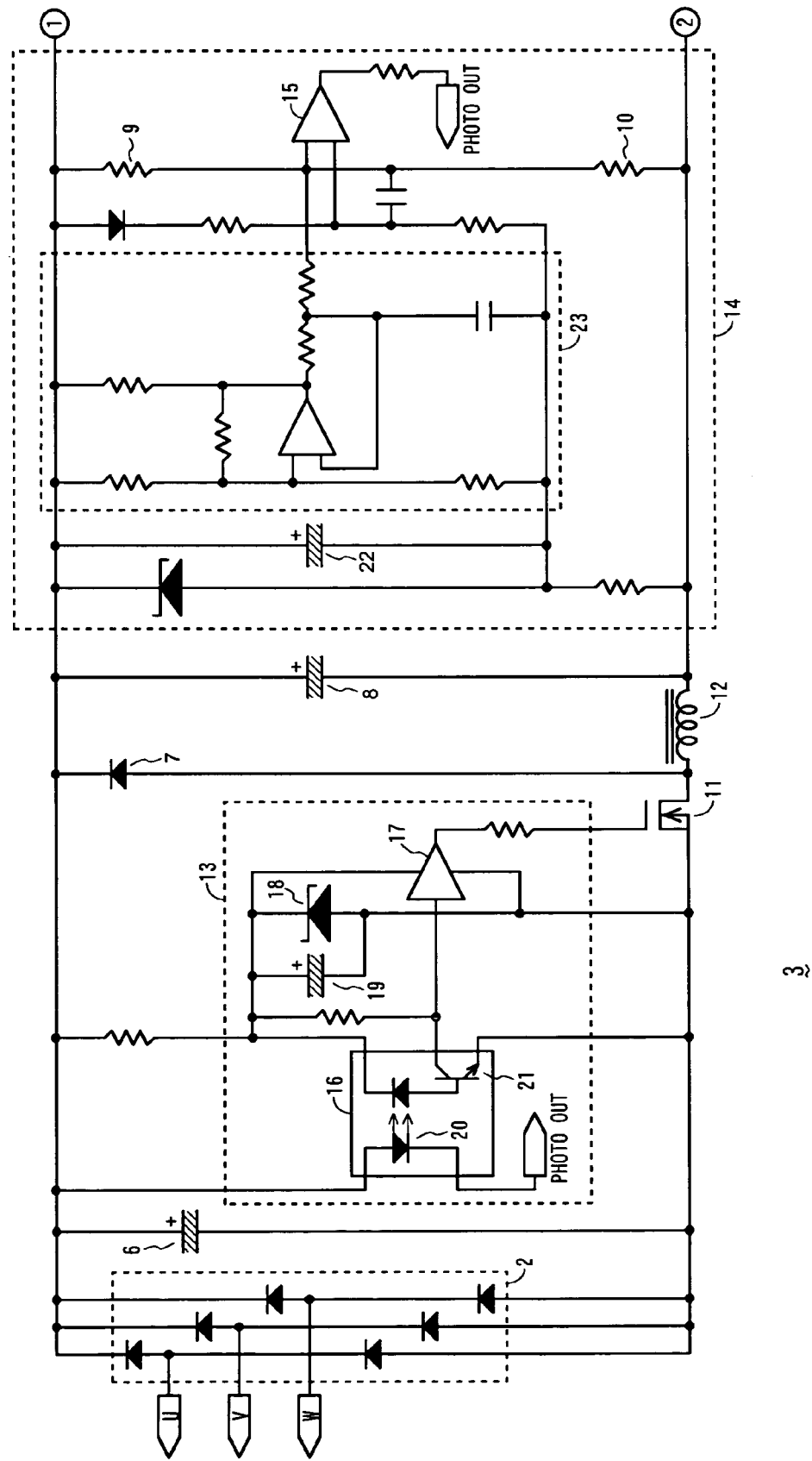
FIG. 3 is a detail circuit diagram of the down converter.
Figure 4:
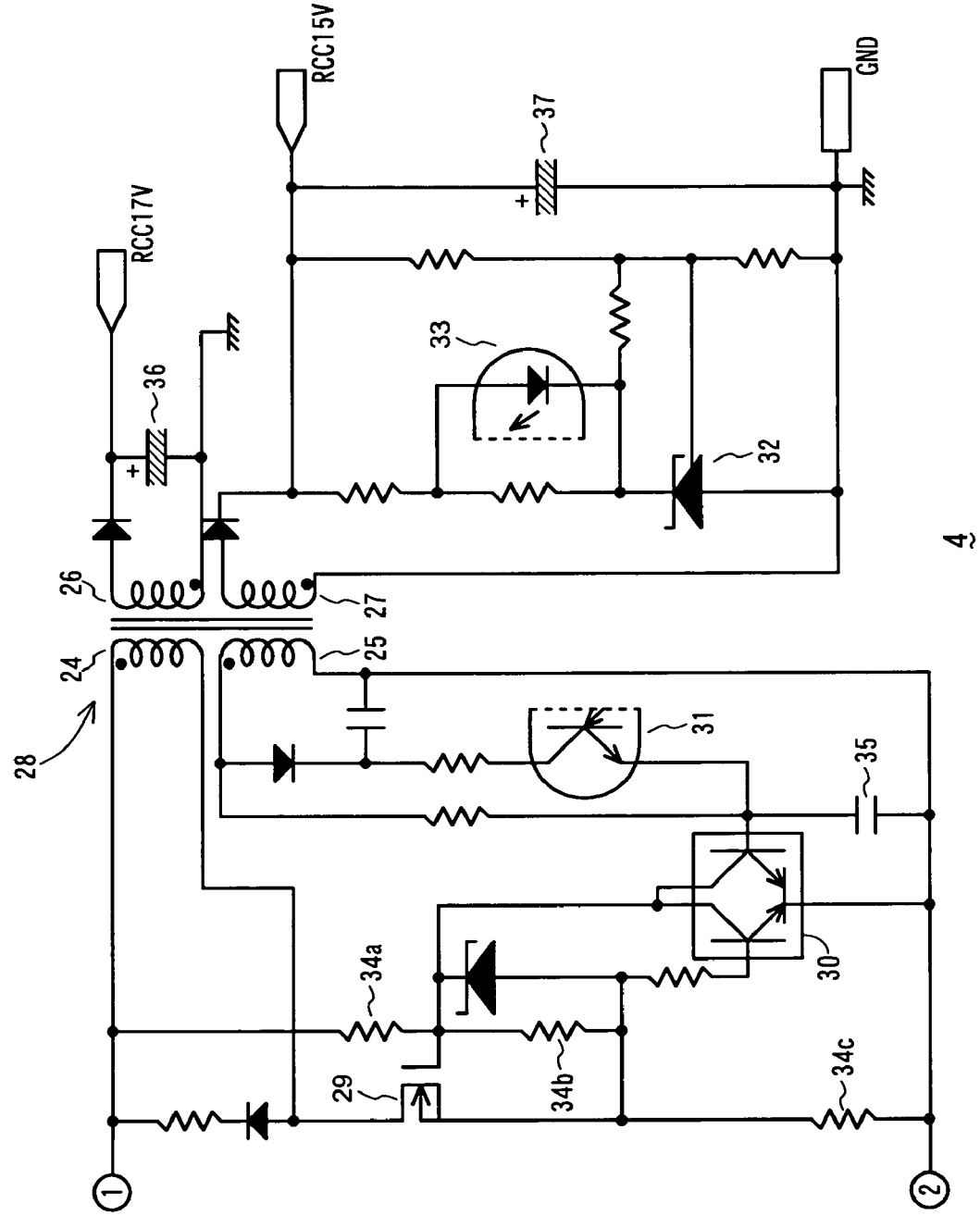
FIG. 4 is a detail circuit diagram of an RCC.

FIG. 3 is a circuit diagram of the rectification circuit 2 and the down converter 3. FIG. 4 is an exemplary detail circuit diagram of the RCC 4. In the drawings, the same reference characters as those in FIGS. 1 and 2 designate the same or like components. In FIG. 3, the rectification circuit 2 is constituted by a diode bridge circuit. The input condenser 6 is charged with the output of the power generator 1 which has been rectified by the rectification circuit 2, thereby smoothing the output of the power generator 1 into an input DC voltage. The drive circuit 13 includes a photo-coupler 16, an inverter buffer 17, and a Zener diode 18 and a condenser 19 which create the power supply voltage for the inverter buffer 17. When the inverter buffer 17 is fed with the power supply voltage, the output of the inverter buffer 17 is supplied to the gate of the FET 11, which turns on the FET 11. The output condenser 8 is charged only during the on time period of the FET 11.

The photo-coupler 16 includes a light-emitting diode 20 and a phototransistor 21, wherein the light-emitting diode 20 is connected, at its cathode, to the output side of the comparator 15 in the PWM circuit 14. Accordingly, while the PWM signals from the PWM circuit 14 are ON, the light-emitting diode 20 is driven to bring the phototransistor 21 into conduction, which inverts the input of the inverter buffer 17. This turns off the FET 11.

The light-emitting diode 20 in the photo-coupler 16 is biased by the PWM signals from the PWM circuit 14, so that the on-time ratio of the phototransistor 21, namely the duty of the FET 11, is determined on the basis of the duty of the PMW signal.

If the voltage representing the output voltage Vout (the voltage resulted from the voltage division by the resistances 9 and 10) exceeds the reference voltage Vref produced by the oscillation circuit 23, the PWM circuit 14 outputs PWM signals with a duty less than 100%. The voltage division through the resistances 9 and 10 is set such that PWM signals with a duty less than 100% are output when the output voltage Vout exceeds a predetermined value (for example, 40V), and the duty ratio is determined such that the output voltage is restricted to 40 V.

In FIG. 4, the RCC 4 includes a transformer 28 constituted by primary-side coils 24, 25 and secondary-side coils 26, 27. The primary-side coils 24 and 25 are connected to a self-excited oscillation circuit including a FET 29, a transistor 30 and a phototransistor 31. The phototransistor 31 constitutes a feedback circuit for controlling the secondary-side voltage to a constant voltage, in cooperation with a Zener diode 32 and a light-emitting diode 33 in the secondary side.

The charging voltage of the output condenser 8 in the down converter 3 connected to the primary side of the RCC 4, namely the output voltage Vout, is divided by resistances 34a, 34b and 34c, and the voltage resulted from the voltage division is applied to the gate of the FET 29. If the FET 29 is turned on, then an electric current flows through the coil 24, which causes a voltage across the coil 25 which corresponds to the winding ratio therebetween. The voltage generated across the coil 25 raises the voltage across the condenser 35, which turns on the transistor 30. With turning on the transistor 30, the FET 29 is turned off.

With turning off the FET 29, voltages are generated across the secondary-side coils 26 and 27, wherein the voltages generated across the secondary-side coils 26 and 27 correspond to the winding ratio therebetween. This causes output condensers 36 and 37 to be charged. If the voltage across the output condenser 37 exceeds a predetermined value (for example, 15 V), this biases the light-emitting diode 33, thereby turning on the phototransistor 31. Then, the transistor 30 is turned on, which drops the gate voltage of the FET 29, thereby turning off the FET 29. As a result, no electric current flows through the primary-side coil 24, which drops the voltage generated in the secondary side. Consequently, the output voltage of the secondary-side coil 27 is maintained at a predetermined value, namely at 15 V. The secondary-side coil 26 generates an output voltage (for example, 17V) different from the output voltage of the coil 27.

The output voltages of the secondary-side coils 26 and 27 are used as power supplies for activating and controlling the engine power generator.

Figure 5:
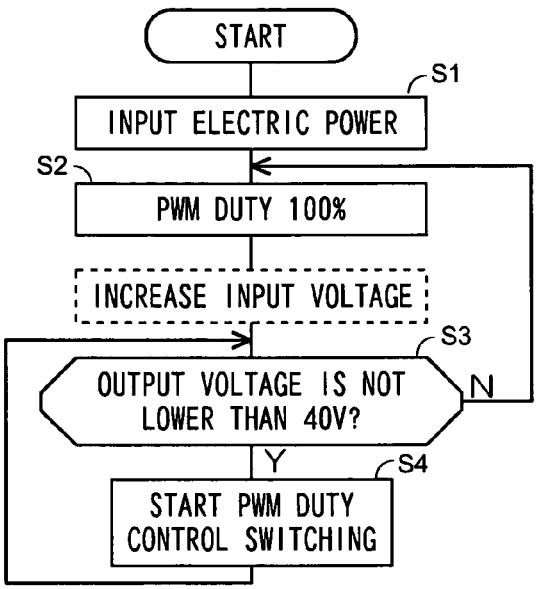
FIG. 5 is a flow chart illustrating the operation of a power supply circuit.

The aforementioned operation will be described with reference to a flow chart. In FIG. 5, at a step S1, the power generator 1 starts power generation to generate electric power. At a step S2, the duty of the PWM circuit 14 is set to 100%. In this case, the 100% duty refers to a duty which can substantially maintain the FET 11 at an ON state and also includes, for example, a duty of about 95%. Since the PWM circuit 14 is set to have a duty of 100%, the FET 11 is substantially maintained at the ON state, which raises the output voltage Vout, along with the increase of the output voltage of the power generator 1. The step S2 is maintained until the output voltage exceeds a predetermined value (for example, 40v). If the output voltage Vout exceeds the predetermined value, then a step S3 results in "Yes", and the processing proceeds to a step S4. At the step S4, the PWM circuit 14 outputs PWM signals with a duty less than 100%, and the drive circuit 13 performs switching of the FET 11, according to the PWM signals. Namely, the duty ratio of the switching is controlled such that the output voltage Vout is maintained at 40 V.

Figure 6:
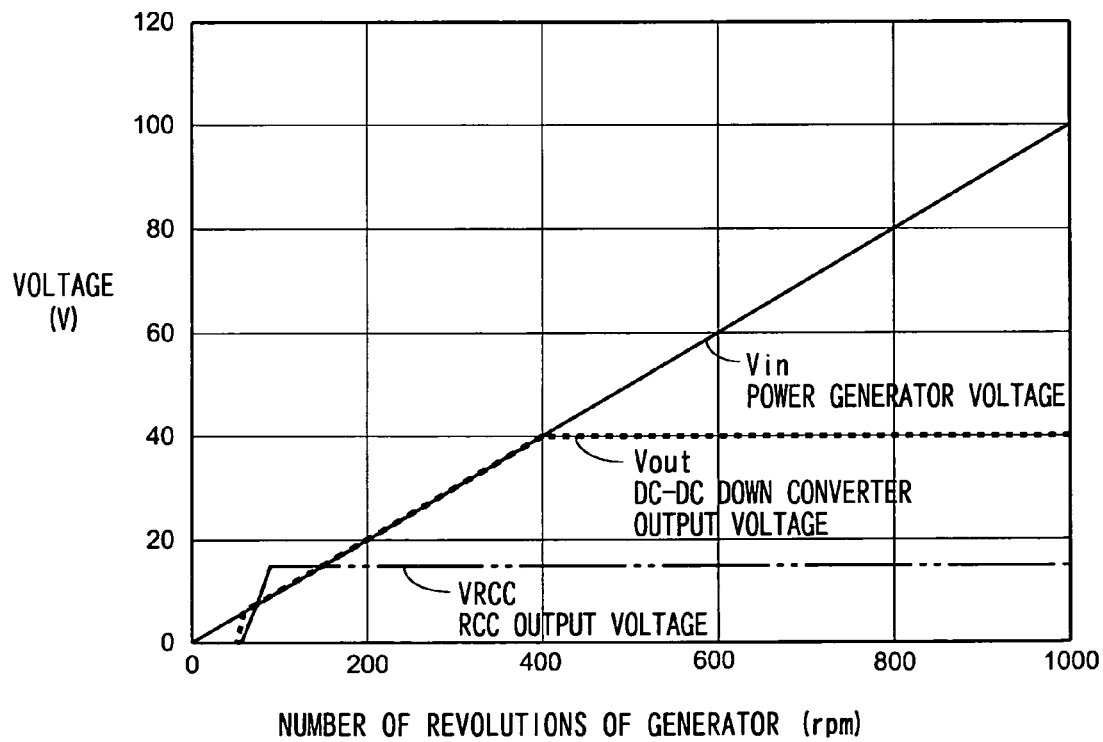
FIG. 6 is a view illustrating the relationship between the rotation speed of the power generator and the output voltage of the power generator, the output voltage of the down converter and the output voltage of the RCC.

FIG. 6 illustrates the relationship between the rotation speed of the power generator 1 and the output voltages. In the drawing, the voltage Vin indicates the output voltage of the power generator 1, the voltage Vout indicates the output voltage of the down converter 3, and the voltage VRCC indicates the output voltage of the secondary-side coil 27 in the RCC 4. As illustrated in the drawing, the voltage Vin is increased with increasing rotation speed of the power generator 1, while the voltage Vout is restricted to a predetermined voltage value (for example, 40V) through the duty control even though the rotation speed of the power generator 1 is increased and, thus, the increase of the voltage Vout is suppressed. Further, the voltage VRCC is stabilized at a predetermined value (for example, 15V), through the self-excited oscillation effect of the RCC 4.

The gate voltage of the FET 29 is set such that, before the voltage Vout reaches the predetermined value, namely 40 V, the RCC 4 starts operation and the Voltage VRCC generates the predetermined value, namely 15V. As illustrated in FIG. 6, the voltage VRCC is stabilized at 15 V in the range of lower rotation speeds equal to or smaller than the rotation speed which causes the voltage Vout to reach 40 V. As described above, the self-excited oscillation type converter has the voltage step-up function through the transformer, and this voltage step-up function enables generating a stable output voltage VRCC greater than the voltage Vin in a lower rotation-speed range.

According to the present embodiment, it is possible to provide a sufficient output voltage, even in a lower rotation-speed range which causes the power generator to generate smaller voltages, such as that during the engine activating operation through the recoil starter or the like. This can ensure a stable power supply for activating the ECU.

On the other hand, in the event of generation of a higher output voltage from the power generator due to the increase of the engine rotation speed after the activation of the engine, the output voltage can be restricted through the high-speed switching of the N-channel FET, which enables high-efficiency operations using the small-size self-excited oscillation type converter.

The controlled power supply according to the present invention can be used as various types of power supply devices, such as power supplies for engine choke-opening controlling motors, ignition devices, charging of batteries, engine starter motors, as well as for ECUs for engine power generators.

The invention claimed is:

1. A power supply device comprising:
   a rectification circuit for rectifying the output of an AC power generator and a DC voltage reduction means for stepping down the DC output from the rectification circuit, said voltage reduction means is a non-insulation type DC/DC converter;
   a self-excited oscillation type converter having a primary side connected to the output side of said non-insulation type DC/DC converter and a secondary side used as the power supply output;
   a switching means for performing duty control on said non-insulation type DC/DC converter; and
   a switching-means driving circuit which maintains said switching means at an ON state until the AC output voltage from said AC power generator exceeds a predetermined value generated by an oscillation circuit when compared in a comparator circuit and starts the duty control with said switching means at the time when said AC output voltage exceeds the predetermined value, wherein the switching-means driving circuit includes said oscillation circuit and said comparator circuit.

2. The power supply device according to claim 1, wherein: the comparator for comparing the AC output voltage with the predetermined value outputs a comparison result to a drive circuit, said drive circuit outputting a drive signal for controlling the switching means for performing duty control on the non-insulation type DC/DC converter.

3. The power supply device according to claim 1, wherein said self-excited oscillation type converter is structured to start operation, before said AC output voltage reaches said predetermined value that causes the start of the duty control for said DC/DC converter.

* * * * *